United States Patent [19]

Fis et al.

[11] Patent Number: 4,843,106

[45] Date of Patent: Jun. 27, 1989

[54] MODIFIED POLYMER POLYOLS

[75] Inventors: Joelle Y. Fis, Ferney-Voltaire, France; Werner A. Lidy, Collonge-Bellerive, Switzerland; Brian D. Phillips, South Glamorgan; David B. Thomas, Gwent, both of Wales

[73] Assignee: BP Chemicals Limited, London, England

[21] Appl. No.: 193,283

[22] PCT Filed: Oct. 14, 1987

[86] PCT No.: PCT/GB87/00719

§ 371 Date: May 9, 1988

§ 102(e) Date: May 9, 1988

[87] PCT Pub. No.: WO88/02760

PCT Pub. Date: Apr. 21, 1988

[30] Foreign Application Priority Data

Oct. 14, 1986 [GB] United Kingdom ............... 8624560

[51] Int. Cl.$^4$ ............................................. C08G 18/14
[52] U.S. Cl. ................................... 521/107; 521/108; 521/137; 521/906; 524/709; 524/710; 524/712; 524/732
[58] Field of Search ............... 521/107, 108, 137, 906; 524/709, 710, 712, 732, 762

[56] References Cited

U.S. PATENT DOCUMENTS

| 3,230,193 | 1/1966 | Moulds et al. | 260/45.7 |
| 4,334,031 | 6/1982 | Otten et al. | 521/106 |
| 4,661,531 | 4/1987 | Davis et al. | 524/710 |

FOREIGN PATENT DOCUMENTS

| 0170206A1 | 1/1986 | European Pat. Off. . |
| 0170206 | 2/1986 | European Pat. Off. . |
| 2714291 | 10/1978 | Fed. Rep. of Germany . |

*Primary Examiner*—Maurice J. Welsh
*Attorney, Agent, or Firm*—Nixon & Vanderhye

[57] ABSTRACT

Fluid polymer polyol dispersions which impart improved fire resistance to polyurethane foam. The fluid polymer polyol dispersions are prepared by grafting one or more monomers onto a polyol backbone with the difference that the grafting takes place in the presence of a flame retardant. During the grafting process the flame retardant is incorporated into the fluid polymer polyol dispersion. When such fluid polymer polyol dispersions are used, the fire resistance of the final polyurethane foam is improved relative to cases where a conventional fluid polymer polyol dispersion and a flame retardant are added separately to the polyurethane foam formulation.

5 Claims, No Drawings

MODIFIED POLYMER POLYOLS

The present invention relates to the preparation of novel modified polymer polyols and their use in making polyurethane foam. In particular, the present invention relates to the preparation of polymer polyols suitable for use in the manufacture of polyurethane foams which are fire resistant.

It is known to prepare polyurethane foams having improved fire resistant properties relative to conventional foams. Such improved fire resistant properties are usually achieved by adding a flame retardant directly into the polyurethane foam formulation along with the other components. Whilst such a method is applicable to flame retardants which are either liquids or solids which are soluble in the foam formulation, it is not generally suitable where the flame retardant is solid which is insoluble in the foam formulation as it is difficult to achieve homogenous dispersion of the flame retardant.

An approach to rendering polyurethane foams fire resistant has now been developed which allows a wider range of flame retardants to be used than before. The approach, which in particular relates to polyurethane foams derived from so-called polymer polyols or graft polyols, comprises incorporating the flame retardant into the polymer polyol during the polymer polyol production stage. Surprisingly, it has been observed that, by using such an approach, it is possible to carry out incorporation of the flame retardant without seriously effecting the viscosity and stability of the polymer polyol.

The approach described above is especially suitable when solid flame retardants are used, since by this method the flame retardant can be incorporated relatively homogenously into the polymer polyol and hence the foam formulation. As a consequence not only is the fire resistance improved for a given level of flame retardant but it has also been found that the quality of the foam structure is improved. The latter effect is also true if liquid retardants are incorporated during the polymer polyol production stage.

Accordingly, the present invention provides a fluid polymer polyol dispersion prepared by reacting a polyol with one or more monomers and an effective amount of a free radical polymerisation catalyst under conditions where the monomer is grafted onto the polyol characterised in that the reaction is carried out in the presence of between 1 and 30% by weight of a flame retardant.

As regards the polyol used in preparing the fluid polymer polyol dispersion, this is conveniently a polyether polyol and is optionally one with deliberately added unsaturation, as might be introduced, for example, by reaction of a polyol with an unsaturated anhydride such as maleic anhydride or the stabilisers of EP No. 162588 and EP No. 162589. Typical polyols which are contemplated by this invention are alkylene oxide adducts of (1) low molecular weight diols and triols or naturally occuring polyols (2) non reducing sugars and derivatives thereof (3) phosphoric, phosphorus, and polyphosphoric acids. Examples of such adducts are the alkylene oxide adducts of ethylene glycol, propylene glycol, glycerol, trimethylolpropane, the isomeric butanediols, hexanediols, octanediols and the like. Alkylene oxide adducts of pentaerythritol, sorbitol, arabitol, mannitol, alkyl glucoside, alkylene glycol glucosides and glycerol glucosides are also contemplated, as are adducts of alkylene diamines and hydrazine.

In general it is desirable that the alkylene oxide used to form the adduct is a 1,2 or 1,3 or 1,4 alkylene oxide having from 2 to 4 carbon atoms. Preferred examples are ethylene oxide, propylene oxide, the butylene oxides, THF, or mixtures thereof, with ethylene oxide and/or propylene oxide being the most preferred.

With such a large number of polyols available for use with the above invention, the choice of polyol will depend very much upon the application for which the polymer polyol is used. In choosing the polyol, an important consideration is its hydroxyl number, that is the average number of free hydroxyl groups per polyol molecule, since this reflects the number of sites available, on the polyol for reaction with isocyanate. Broadly speaking, the larger the hydroxyl number of the polyol the more sites available for participation in the urethane linkage forming reaction and hence the more rigid the foam or elastomer formed. The hydroxyl number of the polyol is conveniently between 10 to 600 and preferably between 20 and 70.

The polyols should have viscosities in the range of 10–2,000 $Kgm^{-1}s^{-1}$ centipoise at 25° C., preferably in the range 10–300 $Kgm^{-1}s^{-1}$.

The monomer used is preferably a vinyl monomer. Suitable vinyl monomers include styrene, acrylonitrile, methacrylonitrile and methylmethacrylate. Under the reactions conditions monomer is grafted onto the backbone of a free radical polymerisation process to produce grafted polymer moieties. It is preferred that the process employs a monomer mixture comprising styrene and acrylonitrile thereby producing a styrene/acrylonitrile copolymer grafted polyol. In this latter case, the ratio of styrene to acrylonitrile can be varied from a ratio producing essentially pure polystyrene through a range of intermediate copolymers to one producing essentially pure polyacrylonitrile. However in general it is desirable to use as much of the cheaper styrene as possible consistent with producing polymer polyols of the correct viscosity and stability which do not give rise to scorch in the final polyurethane foam. A preferred range of styrene acrylonitrile weight ratios is 3:1 to 1:2.

The monomer or monomers used in the present invention are grafted and polymerised by means of a free radical polymerisation catalyst which is added in catalyst amounts to the polyol/monomer mixture. Such catalyst include for example peroxides, e.g hydrogen peroxide, di-t-butyl peroxide, dibenzoylperoxide t-butylhydroperoxide; azo compounds such as azobisisobutyronitrile; as well as persulphates, perborates, percarbonates and the like.

Although the flame retardant can be in principle any material which will improve the fire resistance of polymers the preferred compounds are ones containing phosphorus. Preferably, such phosphorus containing compounds are phosphines, phosphites or phosphates which are substituted with an aryl radical or a halogenated hydrocarbyl radical. Examples of such phosphorus containing compounds include triphenylphosphine, triphenylphosphate, 1,2-diphenylphosphinoethane, triaryl phosphate esters of the type described in EP170206, diphenylphosphate, 2-ethylhexyl, diphenylphosphate, tetrakis (2-chloroethyl)ethylenediphosphate and the like.

The preparation of the fluid polymer polyol dispersion is suitably carried out by reacting the polyol, monomer(s), polymerisation catalyst and flame retardant at a temperature such that the half-life of the polymerisation catalyst is less than six minutes. In practical terms this usually means a temperature in the range 60°-150° C. preferably 80°-125° C.

The process can be carried out for example by feeding the reactants to a continuously operated stirred reaction vessel operating at an appropriate temperature. The extent of polymerisation and grafting can be controlled by choosing an appropriate residence time for the reactants.

In preparing the fluid polymer polyol dispersion, the reactants are suitably employed in amounts such that the reaction mixture comprises between 5 and 50% preferably between 10 and 40% by weight monomer(s) and between 1 and 30% preferably 2 and 5% by weight flame retardant with the balance comprising polyol, polymerisation catalyst and optional extras such as solvents, stabilisers and the like.

The fluid polymer polyol dispersions of the present invention are useful in producing polyurethane foam having improved fire resistance. Accordingly there is also provided a process for producing polyurethane foam which comprises reacting and foaming (a) a fluid polymer polyol dispersion of the type described herein (b) an organic polyfunctional isocyanate, (c) a catalyst for the reaction of components (a) and (b) and (d) a blowing agent.

Techniques for formulating such mixtures are well known to those in the art and include for example one-shot methods performed at or about room temperature.

Organic polyfunctional isocyanates which can be used in the preparation of polyurethane foam will be known to the skilled man. Preferred organic polyfunctional isocyanates include the isomers of toluene diisocyanate (TDI), di(4-isocyantophenyl) methane (MDI) and derivatives as well as $C_2$-$C_{10}$ alkylene diisocyanates and prepolymers of such compounds.

Catalysts which can be used in producing polyurethane foams include tertiary amines and phosphines, strong inorganic bases such as alkali metal hydroxides and alkoxides and carboxylates of tin, titanium and aluminium.

As regards the blowing agent, this is preferably water but halogenated hydrocarbons, e.g dichloromethane, 1,1-dichloro-1-fluoromethane and the like, nitrogen, air and carbon dioxide can also be used.

Other additives in addition to the above can be employed e.g foam stabilisers, pigments, fillers and the like can also be used. Such optional additives will be familiar to the skilled man.

The invention is now illustrated by the following Examples.

EXAMPLE 1

Preparation of a flame retardant polymer polyol using triphenylphosphine 62.5 g of triphenylphosphine, 201 g of styrene and 86.3 g of acrylonitrile were mixed until a clear solution was formed. To this mixture was added 4.4 g of the polymerisation catalyst azobisisobutyronitrile (AIBN), 62.5 g of stabiliser polyol RP 1268 (stabiliser according to EP 162589) and 277 g of polyol CP3 (ex BP Chemicals Ltd). The above premix was added into 555 g of a polyether triol (MW=4800) over 30 minutes at 125° C.

After addition the total mixture was maintained at 125° C. for a further 30 minutes before it was cooled. After cooling volatiles were stripped in a Buchi evaporator over 90 minutes.

The product which comprised a flame retardant polymer had the following properties:

| | |
|---|---|
| viscosity = | 216 Kgm$^{-1}$s$^{-1}$ |
| centrifugal solids = | 1.6% |
| polymer content = | 23% |
| filtrability = | 150 mest (17 secs) 100% |
| | 700 mesh (150 secs) 65% |

EXAMPLE 2

Preparation of polyurethane foam from the polymer polyol of Example 1

A polyurethane foam was produced from a formulation having the composition:

| | Parts by weight |
|---|---|
| Polyol CP3 (BP Chemicals polyol-MW 4800) | 25 |
| Polymer polyol (ex Example 1) | 75 |
| Water | 2.75 |
| A-1 (UCC amine catalyst) | 0.046 |
| 33LV (Air product amine catalyst) | 0.55 |
| DEOA (Diethanolamine) | 1.0 |
| SH 209 (BP Silicone Stabiliser) | 0.64 |
| TDI 80/20 (index 107) | 107 |

The polyurethane foam had a density of 45 gl$^{-1}$.

Comparative Test A

A polymer polyol was prepared exactly as according to Example 1 except that the triphenylphosphine was omitted. The polymer polyol produced was added to the polyurethane foam formulation of Example 2 together with 3.75 parts by weight triphenylphosphine. The final foam had a density of 46 gl$^{-1}$.

Flammability Test 5 pieces of the Example 2 polyurethane foam and 5 pieces of the comparative test foam, each piece being of dimensions 30×7.5×1.25 cm, was submitted to the California Test 117A for flammability. The results were as follows:

| | Example | Comparative Test |
|---|---|---|
| Average Char length | 38.4 mm | 92.4 mm |
| Average after flame time | 0 secs | 11.2 secs |

These results show that polyurethane foams made from the polyols of the present invention char less and flame for a shorter time relative to those foams prepared by adding the flame retardant into the foam formulation.

Comparative Test B

Comparative Test A was repeated except that the triphenylphosphine was completely omitted. The foam produced had a density of 45.4 gl$^{-1}$.

The results of the flammability test (averaged over 5 pieces) were:

| | |
|---|---|
| Average Char length | 300 mm |
| Average after flame time | 45.3 secs |

EXAMPLE 3

Preparation of a flame retardant polymer polyol using triphenylphosphate

Example 1 was repeated except that triphenylphosphate was used in place of triphenylphosphine. The product polymer polyol had the following properties:

| | |
|---|---|
| viscosity = | 237 Kgm$^{-1}$s$^{-1}$ |
| centrifugal solids = | 1.7% |
| polymer content = | 23% |
| filtrability = | 150 mesh (17 seconds) 100% |
| | 700 mesh (150 seconds) 66% |

EXAMPLE 4

Preparation of polyurethane foam and flammability test

A polyurethane foam was prepared from the polymer polyol of Example 3 using the formulation of Example 2. The foam had a density of 45 gl$^{-1}$. The results of the flammability test (averaged over 5 pieces) were as follows:

| | |
|---|---|
| Average Char length | 35.6 mm |
| Average after flame time | 0 secs |

EXAMPLE 5

Preparation of polymer polyol using tetrakis (2-chloroethyl) ethylene diphosphate Example 1 was repeated except that the above-mentioned phosphate was used in place of triphenylphosphine. The product polymer polyol had the following properties:

| | |
|---|---|
| viscosity = | 239 Kgm$^-$s$^{-1}$ |
| centrifugal solids = | 1.6% |
| polymer content = | 23% |
| filtrability = | 150 mesh (17 seconds) 100% |
| | 700 mesh (150 seconds) 72% |

EXAMPLE 6

Preparation of polyurethane foam and flammability test

A polyurethane foam was prepared from the polymer polyol of Example 5 using the formulation of Example 2. The results of the flammability test (averaged over 5 pieces) were as follows:

| | |
|---|---|
| Average char length | 52.2 mm |
| Average after flame time | 0 secs |

To summarise, the Examples and Comparative Test show that, when fluid polymer polyol dispersions of the present invention are used, the flame resistance of the resulting polyurethane foam is better than observed (a) when unmodified polymer polyol dispersions alone are used or (b) when modified polymer polyol dispersions are used in conjunction with a flame retardant added separately to the polyurethane foam formulation.

We claim:

1. A fluid polymer polyol dispersion prepared by reacting a polyol with one or more monomers and an effective amount of a free radical polymerization catalyst under conditions where monomer is grafted onto the polyol, the reaction being carried out in the presence of between 1 and 30% by weight of a flame retardant.

2. A fluid polymer polyol dispersion as claimed in claim 1, wherein the reaction is carried out in the presence of between 2 and 5% by weight of the flame retardant.

3. A fluid polymer polyol dispersion as claimed in claim 1, wherein the flame retardant is selected from the group consisting of triphenylphosphine, triphenylphosphate, triarylphosphate esters of formula (RO)$_3$PO where the R groups are independently

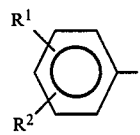

where the R$^1$ and R$^2$ groups are independently H or C$_n$H$_{2n+1}$, wherein n is 1 to 9, with the exception where all the R groups are

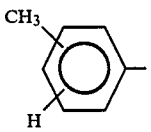

diphenylphosphate, 2-ethylhexyl, diphenylphosphate and tetrakis (2-chloroethyl)ethylenediphosphate.

4. A fluid polymer polyol dispersion as claimed in claim 3, wherein the monomer(s) used in the reaction are selected from the group consisting of styrene, acrylonitrile and mixtures thereof.

5. A process for preparing polyurethane foam which comprises reacting and foaming a formulation wherein the formulation comprises (a) a fluid polymer polyol dispersion of the type defined in claim 6; (b) an organic polyfunctional isocyanate; (c) a catalyst for the reaction of components (a) and (b); and (d) a blowing agent.

* * * * *